March 3, 1942. O. J. HORGER 2,274,962
WHEEL AND AXLE ASSEMBLY
Original Filed Oct. 14, 1938
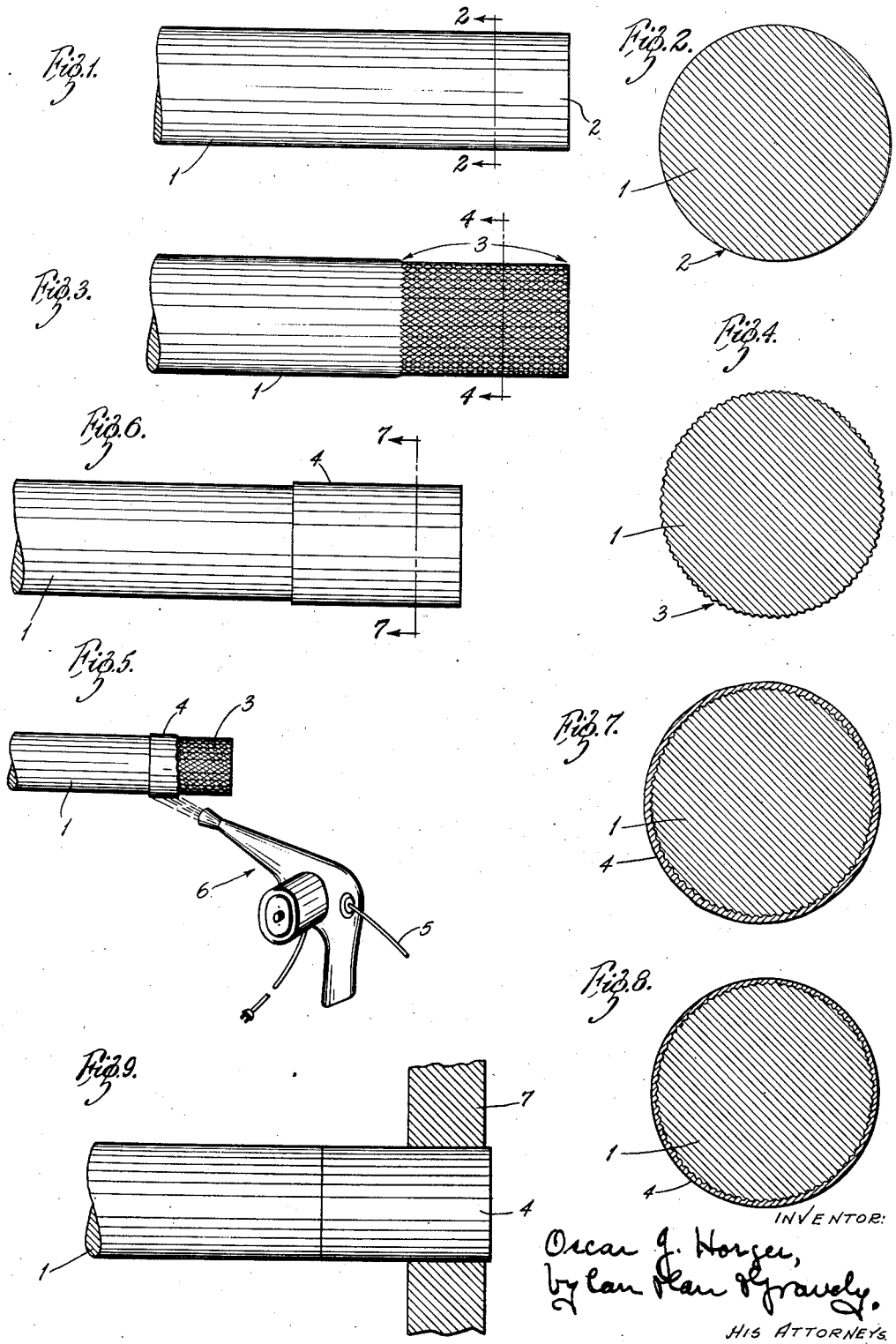
INVENTOR:
Oscar J. Horger,
by Van Ran Gravely.
HIS ATTORNEYS.

Patented Mar. 3, 1942

2,274,962

UNITED STATES PATENT OFFICE 2,274,962

WHEEL AND AXLE ASSEMBLY

Oscar J. Horger, Canton, Ohio, assignor to The Timken Roller Bearing Company, Canton, Ohio, a corporation of Ohio Original application October 14, 1938, Serial No. 234,871. Divided and this application May 1, 1941, Serial No. 391,241

6 Claims. (Cl. 295—43)

This application is a division of my application Serial No. 234,871 filed October 14, 1938, for Process of producing a wheel and axle assembly.

In modern practice, car wheels and especially locomotive wheels are mounted on their axles by press fitting with very high pressure and this fact, together with severe service conditions, has caused axles to fracture by fatigue just inside the inner end of the wheel hub. The purpose of the present invention is to increase the fatigue strength of such axles, and the invention consists mainly in metallizing the wheel seat portion of the axle prior to press fitting the wheel thereon.

In the accompanying drawing,

Fig. 1 is an elevation of a portion of an axle prior to modification by my process, Fig. 2 is a sectional view on the line 2—2 in Fig. 1, Fig. 3 is a view of said axle with the end or wheel seat portion knurled or roughened, Fig. 4 is a sectional view on the line 4—4 in Fig. 3, Fig. 5 is an elevation of the axle of Fig. 3 showing the spraying of molten metal thereon, Fig. 6 is a view of the axle after the metallized coat has been completed, Fig. 7 is a sectional view on the line 7—7 in Fig. 6, Fig. 8 is a similar sectional view after the axle of Figs. 6 and 7 has been turned or otherwise finished; and Fig. 9 is a view of the axle with a wheel applied thereto, only a portion of the wheel being shown and in section.

In making a wheel and axle assembly embodying my invention, I start with a steel axle 1 of ordinary composition and dimensions. I roughen the wheel seat portion 2 of this axle by any suitable process, such as knurling, sand blasting or blasting with steel chips; and I extend the area 3 of roughening somewhat beyond the limit of the wheel seat, say, one-quarter of an inch or more. I then metallize the roughened portion to provide a coat 4 of added metal of substantial thickness, say about $\frac{1}{32}$ of an inch thick. For the purpose of metallizing, it is desirable to use steel wire 5 of a suitable composition by feeding it to an oxyacetylene torch 6 to melt it and to spray or nebulize the molten metal by means of an air blast back of the flame and directed toward the wheel seat portion of the axle. During this operation of spraying, the axle is preferably mounted in a lathe (not shown) and rotated on its axis until the metallized coat 4 reaches the predetermined thickness. I have found stainless steel wire to be suitable material for metallizing but even better results have been obtained by the use of steel wire containing 1.2% of carbon.

After the metallizing operation, the outer portion of the metallized coat 4 is removed, by turning or grinding, to true the surface thereof and reduce it to the predetermined diameter shown in Figs. 8 and 9. A wheel 7 is then press fitted thereon with the requisite pressure and, as the metallized coat is longer than the hub of the wheel, such coat projects somewhat beyond the inner end of the hub.

I have found by careful tests that the fatigue strength of an axle metallized as heretofore described is very materially greater than the fatigue strength of an unmetallized axle of the same steel and wheel seat diameter.

What I claim is:

1. The combination of a steel axle having a wheel seat portion with a thin metallized coating and a wheel press fitted on said portion.

2. The combination of a steel axle having a wheel seat portion with a thin metallized coating and a wheel press fitted on said portion, said metallized portion extending beyond said wheel.

3. The combination of a steel axle having a thin metallized coat of steel less than one thirty-second of an inch thick containing 1.20 per cent carbon metallized on a portion thereof, and a wheel press fitted on said metallized portion.

4. The combination of a steel axle having a thin metallized coat of steel less than one-thirty second of an inch thick containing 1.20 per cent carbon metallized on a portion thereof, and a wheel press fitted on said metallized portion, said coat extending beyond said wheel.

5. A steel axle having a wheel seat portion and a thin metallized coating less than one-thirty-second of an inch thick on said wheel seat portion.

6. A steel locomotive wheel axle having a wheel seat and a thin metallized coating less than one thirty-second of an inch thick covering and extending beyond said wheel seat, said coating containing 1.20 per cent of carbon.

OSCAR J. HORGER.